United States Patent
Hara

(10) Patent No.: US 8,661,209 B2
(45) Date of Patent: *Feb. 25, 2014

(54) DATA PROCESSING APPARATUS, DATA PROCESSING METHOD, AND COMPUTER-READABLE RECORDING MEDIUM FOR WRITING AND READING DATA TO AND FROM A STORAGE

(75) Inventor: Hiroyuki Hara, Osaka (JP)

(73) Assignee: KYOCERA Document Solutions Inc. (JP)

( * ) Notice: Subject to any disclaimer, the term of this patent is extended or adjusted under 35 U.S.C. 154(b) by 462 days.

This patent is subject to a terminal disclaimer.

(21) Appl. No.: 13/048,296

(22) Filed: Mar. 15, 2011

(65) Prior Publication Data

US 2011/0225378 A1 Sep. 15, 2011

(30) Foreign Application Priority Data

Mar. 15, 2010 (JP) ................................ 2010-058496
May 10, 2010 (JP) ................................ 2010-108119

(51) Int. Cl.
*G06F 12/00* (2006.01)
*G06F 3/12* (2006.01)
*G06K 15/02* (2006.01)
*G06F 15/02* (2006.01)

(52) U.S. Cl.
CPC ....... *G06F 3/12* (2013.01); *G06F 12/00* (2013.01); *G06K 15/02* (2013.01); *G06F 15/0283* (2013.01)
USPC .......................................... 711/154; 358/1.17

(58) Field of Classification Search
None
See application file for complete search history.

(56) References Cited

U.S. PATENT DOCUMENTS

| | | | | |
|---|---|---|---|---|
| 5,136,688 A * | 8/1992 | Morikawa et al. | ........... | 358/1.16 |
| 5,768,484 A * | 6/1998 | Arai et al. | ..................... | 358/1.16 |
| 6,092,149 A * | 7/2000 | Hicken et al. | .................. | 711/113 |
| 6,321,266 B1 * | 11/2001 | Yokomizo et al. | ............ | 709/226 |
| 6,567,886 B1 * | 5/2003 | Saitoh et al. | ................... | 711/111 |

(Continued)

FOREIGN PATENT DOCUMENTS

| | | |
|---|---|---|
| CN | 101800867 | 8/2010 |
| JP | 10-214247 | 8/1998 |
| JP | 2002-011925 | 1/2002 |
| JP | 2007-179496 | 7/2007 |

OTHER PUBLICATIONS

TIFF Revision 6.0, Adobe Developers Association, Jun. 3, 1992, pp. 1-60, Mountain View, California, part 1.

(Continued)

*Primary Examiner* — Kaushikkumar Patel
(74) *Attorney, Agent, or Firm* — McDonnell Boehnen Hulbert & Berghoff LLP

(57) ABSTRACT

A data processing apparatus includes a storage controller and a processor. The storage controller is configured to write a series of data blocks constituting a particular unit of data to a storage and read out the series of data blocks from the storage. The processor is further configured to generate a write-side process and a read-side process, notify the read-side process from the write-side process of an identifier of a storage area in the storage, cause the storage controller to sequentially write the series of data blocks to the storage area using the write-side process, and cause the storage controller to read the series of data blocks from the storage area corresponding to the identifier using the read-side process after the identifier is received in the read-side process.

18 Claims, 12 Drawing Sheets

(56) References Cited

U.S. PATENT DOCUMENTS

| | | | |
|---|---|---|---|
| 6,587,655 B2* | 7/2003 | Maekawa | 399/82 |
| 7,646,502 B2* | 1/2010 | Suzuki | 358/1.15 |
| 8,023,143 B2* | 9/2011 | Tao | 358/1.16 |
| 2002/0093669 A1* | 7/2002 | Campbell et al. | 358/1.9 |
| 2004/0064792 A1* | 4/2004 | Sugimoto | 715/526 |
| 2004/0264485 A1* | 12/2004 | Okamura | 370/412 |
| 2005/0141032 A1* | 6/2005 | Yamamoto | 358/1.17 |
| 2005/0286149 A1* | 12/2005 | Haswell | 360/22 |
| 2006/0007467 A1* | 1/2006 | Tsunekawa | 358/1.13 |

OTHER PUBLICATIONS

TIFF Revision 6.0, Adobe Developers Association, Jun. 3, 1992, pp. 61-121, Mountain View, California, part 2.

* cited by examiner

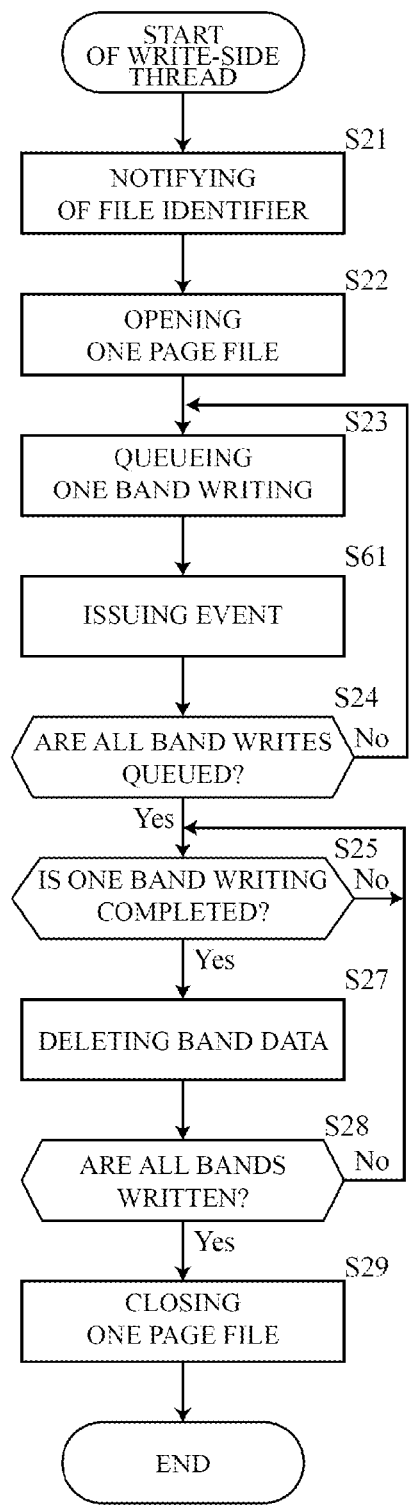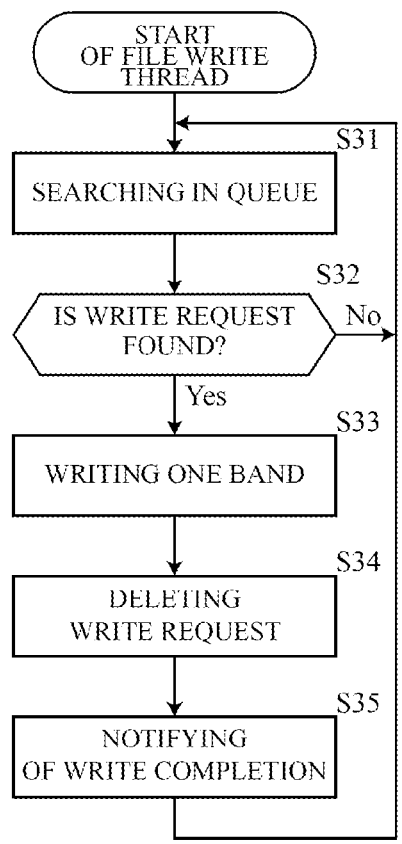
FIG. 10A
FIG. 10B

DATA PROCESSING APPARATUS, DATA PROCESSING METHOD, AND COMPUTER-READABLE RECORDING MEDIUM FOR WRITING AND READING DATA TO AND FROM A STORAGE

REFERENCE TO RELATED APPLICATIONS

This application is based upon, and claims the benefit of priority from, Japanese Patent Application No. 2010-058496, filed in the Japan Patent Office on Mar. 15, 2010 and Japanese Patent Application 2010-108119 filed in the Japan Patent Office on May 10, 2010, the entire contents of both of which are incorporated herein by reference.

BACKGROUND

1. Technical Field

The present disclosure relates to a data processing apparatus, a data processing method, and a computer-readable recording medium.

2. Description of the Related Art

A typical image forming apparatus such as a copier or a multi-functional device has a built-in data processing apparatus that performs various types of image processing. At the time of image data buffering, the typical data processing apparatus stores the image data for one page in a file in a storage such as an HDD (hard disk drive) on the basis of a write-side program code (for example, a certain image processing program code). After that, the typical data processing apparatus notifies a read-side program code (for example, an image processing program code in a later stage) of a file identifier of the file. The image data is read out from the file in the storage on the basis of the read-side program code.

Also, it is typical in data processing that when data is written to the HDD, a FIFO (First-In First-Out) buffer is provided. Here, the data is first written in the FIFO buffer by one thread, and the data is then written to the HDD from the FIFO buffer by another thread.

After a particular unit of data (in the above-mentioned case, a page) is stored in the storage, when the data is read out as described above, the write/read operations of the data are successively carried out. For this reason, before the write operation of the particular unit of data is completed, the data cannot be read out. This may cause a delay in processing after the buffering.

SUMMARY

A data processing apparatus according to an embodiment of the present disclosure includes a storage controller and a processor. The storage controller is configured to write a series of data blocks constituting a particular unit of data to a storage and read out the series of data blocks from the storage. The processor is configured to (i) generate a write-side process and a read-side process, (ii) notify the read-side process from the write-side process of an identifier of a storage area in the storage, (iii) cause the storage controller to sequentially write the series of data blocks to the storage area using the write-side process, and (iv) cause the storage controller to read out the series of data blocks from the storage area corresponding to the identifier using the read-side process after the identifier is received in the read-side process.

A computer-readable recording medium according to an embodiment of the present disclosure stores a data processing program code to be executed by a processor of a data processing apparatus. The data processing program code includes first to fourth sub-program codes. The first sub-program code causes the processor to generate a write-side process and a read-side process. The second sub-program code causes the processor to notify the read-side process from the write-side process of an identifier of a storage area in the storage. After that, the third sub-program code causes the processor to control the storage controller to sequentially write a series of data blocks constituting a particular unit of data to the storage area using the write-side process. The fourth sub-program code causes the processor to control the storage controller to read out the series of data blocks from the storage area corresponding to the identifier using the read-side process when the identifier is received in the read-side process.

A data processing method according to an embodiment of the present disclosure is executed by a storage controller and a processor of a data processing apparatus. The storage controller writes a series of data blocks constituting a particular unit of data to a storage and reads out the series of data blocks from the storage. The processor (i) generates a write-side process and a read-side process, (ii) notifies the read-side process from the write-side process of an identifier of a storage area in the storage, (iii) after that, causes the storage controller to sequentially write the series of data blocks to the storage area using the write-side process, and (iv) causes the storage controller to read out the series of data blocks from the storage area corresponding to the identifier using the read-side process when the identifier is received in the read-side process.

Additional features and advantages are described herein, and will be apparent from the following Detailed Description and the figures.

BRIEF DESCRIPTION OF THE DRAWINGS

In the accompanying drawings:

FIG. 10A shows a flow chart for describing a write operation in a write-side thread according to a third embodiment;

FIG. 10B shows a flow chart for describing a write operation in a file write-thread according to the third embodiment;

DETAILED DESCRIPTION

Hereinafter, embodiments of the present disclosure will be described on the basis of drawings.

Figure 1:
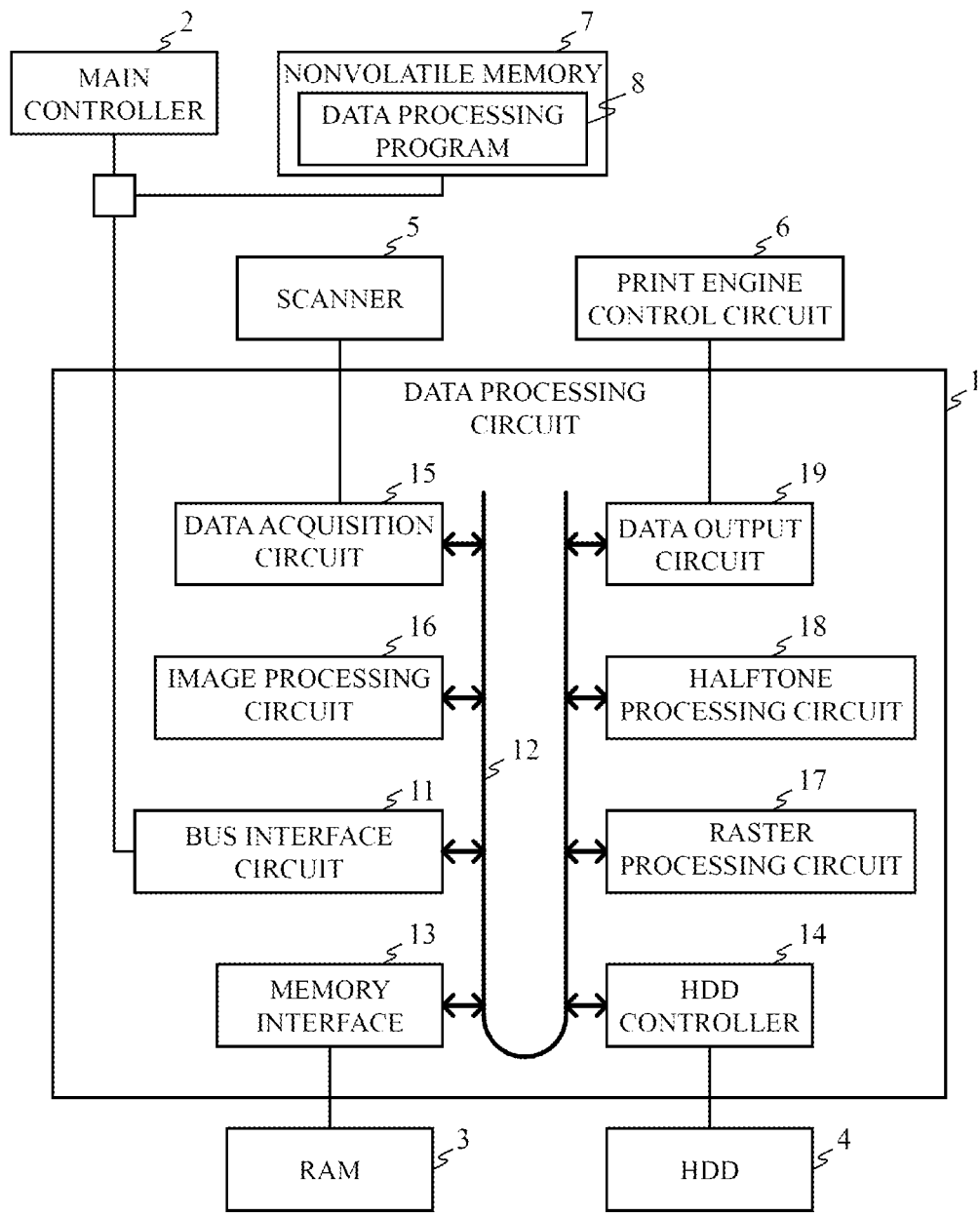
FIG. 1 shows a block diagram illustrating a configuration of a data processing apparatus according to an embodiment of the present disclosure.

FIG. 1 shows a block diagram illustrating a configuration of a data processing apparatus according to an embodiment of the present disclosure. The data processing apparatus illustrated in FIG. 1 has data processing circuit 1, main controller 2, RAM (Random Access Memory) 3, HDD 4, scanner 5, print engine control circuit 6, nonvolatile memory 7, print engine for performing a print on a sheet (not shown), and the like.

Data processing circuit 1 is a device that processes image data in a band unit or page unit from scanner 5 or the like to be output to HDD 4 or print engine control circuit 6.

Main controller 2 is a processor such as a CPU (Central Processing Unit). Main controller 2 supplies instructions to respective units in data processing circuit 1 via bus interface circuit 11 and bus 12. Main controller 2 outputs an instruction on the basis of data processing program code 8 stored in nonvolatile memory 7.

RAM 3 is a memory comprising, for example, one or a plurality of DRAMs (Dynamic RAM). RAM 3 temporarily stores band data for processing by data processing circuit 1.

HDD 4 is a storage that temporarily stores a series of band data constituting image data for one page.

Scanner 5 is a device that optically reads an image on an original and outputs image data acquired through the image reading.

Print engine control circuit 6 is a device that supplies print image data to a print engine and also controls the print engine to execute printing.

Nonvolatile memory 7 is a flash memory, a ROM (Read Only Memory) and the like. Nonvolatile memory 7 stores various program codes and data used by main controller 2. Data processing program code 8 is stored in nonvolatile memory 7.

A configuration of data processing circuit 1 will be described.

Data processing circuit 1 includes bus interface circuit 11, bus 12, memory interface 13, HDD controller 14, data acquisition circuit 15, image processing circuit 16, raster processing circuit 17, halftone processing circuit 18, and data output circuit 19. It should be noted that data processing circuit 1 may be realized by an ASIC (Application Specific Integrated Circuit).

Bus interface circuit 11 is a device that connects main controller 2 to bus 12.

Memory interface 13 is a device that transmits/receives data and instructions between RAM 3 and bus 12.

HDD controller 14 is a device that reads and writes the data with respect to HDD 4 in accordance with instructions from main controller 2.

Data acquisition circuit 15 is a device that sequentially acquires the image data from scanner 5 as the band data to be stored in RAM 3 or HDD 4 in accordance with instructions from main controller 2. Data acquisition circuit 15 has a DMA (Direct Memory Access) controller. For example, the band data is data for 128 lines, and each page has the band data for 58 bands.

Image processing circuit 16 is a device that executes an image processing (image expansion, image reduction, color conversion, or the like) on the band data. Image processing circuit 16 reads out the band data of the image data from RAM 3 or HDD 4 in accordance with the instruction from main controller 2 for the image processing. Image processing circuit 16 stores the band data after the image processing in RAM 3 or HDD 4. Image processing circuit 16 has a DMA controller.

Raster processing circuit 17 is a device that rasterizes those pieces of band data to generate the raster data. Raster processing circuit 17 reads out the band data of the image data from RAM 3 or HDD 4 for rasterizing. Raster processing circuit 17 stores the raster data in HDD 4 for each band.

Halftone processing circuit 18 is a device that transfers the raster data from HDD 4 to RAM 3 for each band to execute the half-tone processing. Halftone processing circuit 18 stores the data after the halftone processing in RAM 3.

Data output circuit 19 is a device that reads out the data after the halftone processing from RAM 3 to be supplied to print engine control circuit 6.

In data processing circuit 1, the image data acquired from scanner 5 is subjected to an image processing such as a rotation or an expansion/reduction, as needed. After that, print image data is generated through halftoning and output to print engine control circuit 6. In mid-course of these processings, RAM 3 is used for data buffering in the band unit, and HDD 4 is used for data buffering in the page unit.

Figure 2:
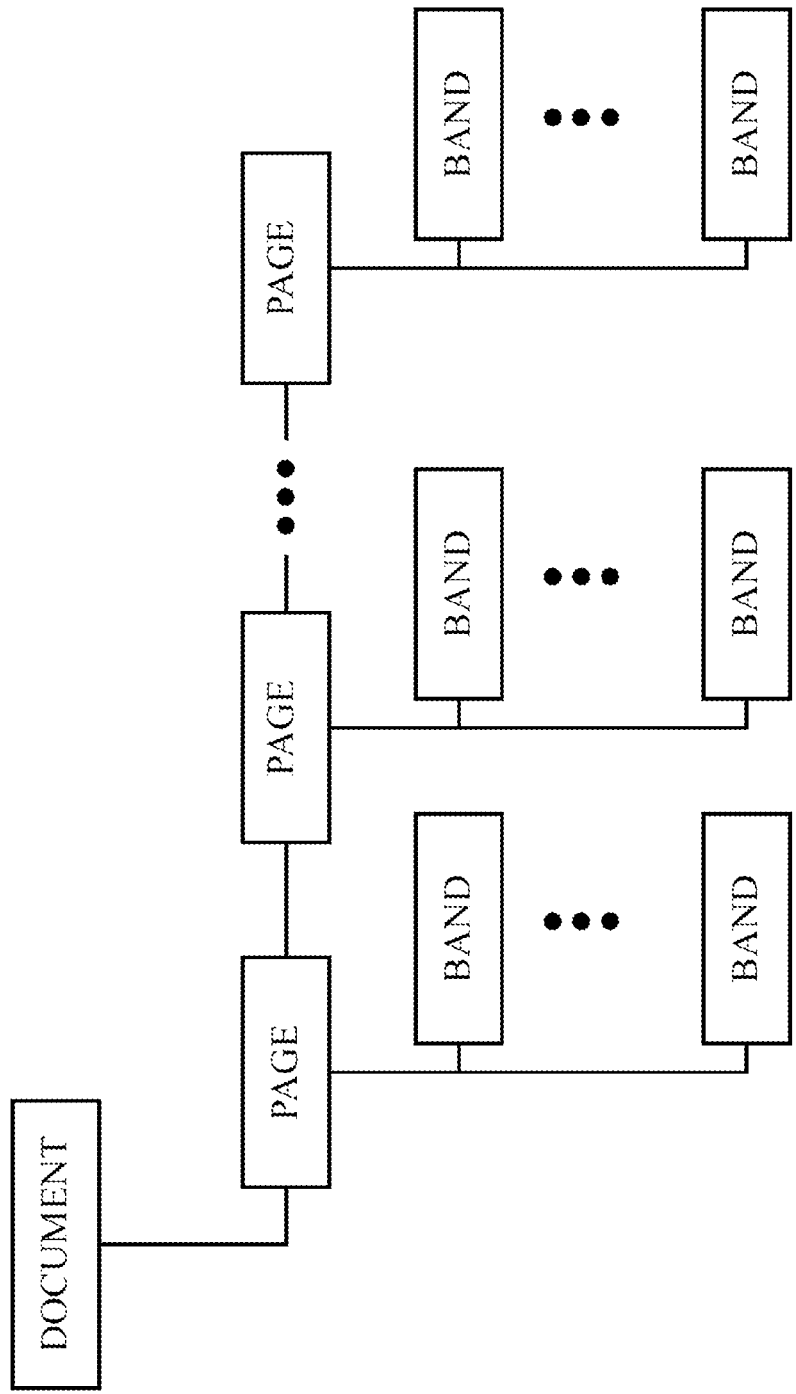
FIG. 2 shows a structure of data used by the data processing apparatus in FIG. 1.

FIG. 2 shows a structure of data used by data processing circuit 1. Document data is constructed by one or more pieces of page data. Each page data is constructed by pieces of band data. Data on one document is supplied to main controller 2 as one job.

Specifically, a structure of the document data is represented by a list of data elements including document node data, page node data, and the band data. Document node data includes link information to page node data. The page node data includes link information to the band data. The band data includes identification information of the band data in the page, the state of the band data, and the like. Therefore, with these links, it is possible to identify certain band data on a certain page in the document.

To be more specific, one or more documents are represented by a link list of document node data. To the document node data on each document, a link list of page node data on one or more pages constituting the document is connected as a branch. Furthermore, to the page node data on each page, a link list of band data on a plurality of bands constituting the page is connected as a branch.

Figure 3:
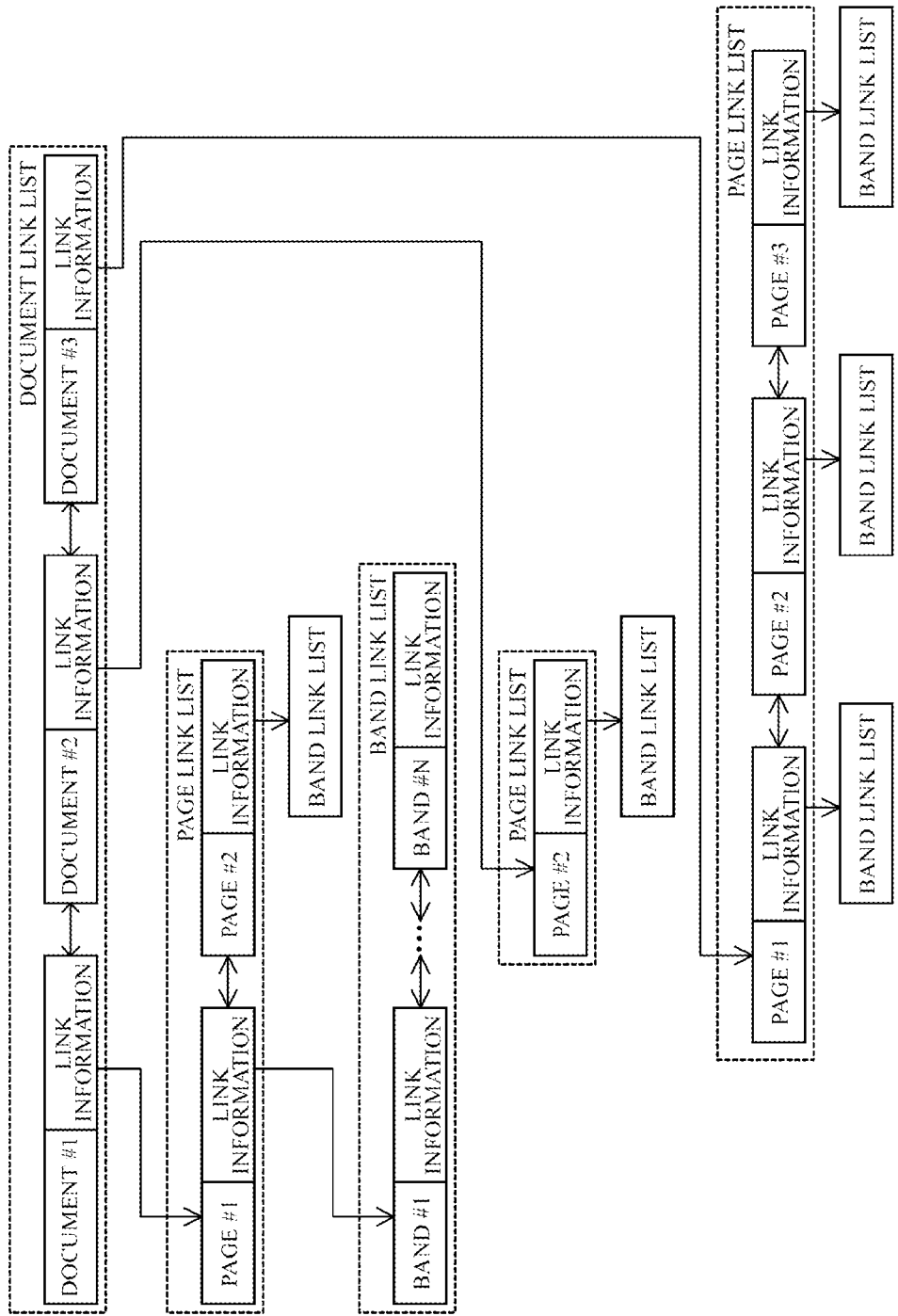
FIG. 3 shows an example data used by the data processing apparatus in FIG. 1.

FIG. 3 shows an example data used by data processing circuit 1. As shown in FIG. 3, this data structure has a three-layer structure of a document link list, a page link list, and a band link list.

In the FIG. 3, the document link list includes three pieces of document node data. Herein, the respective piece of document node data includes identification information indicated by "document #1" or the like and link information (hereinafter, the respective pieces of document node data are described in the identification information). Document #1 includes the link information to subsequent document #2. Document #2 includes the link information to subsequent document #3. With this configuration, the respective pieces of document node data in the document link list are linked in an order of identification numbers.

The respective pieces of document node data further include the link information to the page link list. Herein, the page link list of document #1 includes the page node data for two pages. The respective pieces of page node data include identification information indicated by "page #1" or the like and link information (hereinafter, the respective pieces of page node data are described in the identification information). The link information of document #1 is linked to page #1, which is the leading page node data. Page #1 also includes the link information to subsequent page #2. In this manner, document #1 is linked to the page link list by directly or indirectly connecting to the respective pieces of page node data in the page link list. In a similar manner, document #2 is linked to the page link list by directly or indirectly connecting to page #1 of document #2, and document #3 is linked to the page link list by directly or indirectly connecting to pages #1, #2, and #3 of document #3.

The respective pieces of page node data further include the link information to the band link list. The band link list of page #1 of document #1 includes N pieces of band data. Herein, as the number of bands in one page is constant, the size of the band link list is constant. The respective pieces of the band data include identification information represented by "band #1" or the like, image data for one band, and link information (hereinafter, the respective pieces of the band data are described in the identification information). The link information of page #1 of document #1 is linked to band #1 that is the leading band data. Band #1 includes the link information to subsequent band #2. In a similar manner, the respective pieces of the band data include the link information to the subsequent band data. It should be noted that the link information of rear-most band #N includes information indicating that the position is the rear-most. In this manner, page #1 is linked to the band link list by directly or indirectly connecting to the respective pieces of the band data. The other page node data is also linked to the band link list in a similar manner as page #1 of document #1.

As described above, the document data used by data processing circuit 1 is linked from the document link list to the page link list and the band link list. Therefore, the document data has a configuration that is established that the document node data, the page node data, and the band data are mutually linked directly or indirectly.

Next, write/read operations of the band data to/from HDD 4 by the above-mentioned data processing apparatus will be described with reference to three separate embodiments.

1. First Embodiment

Figure 4:
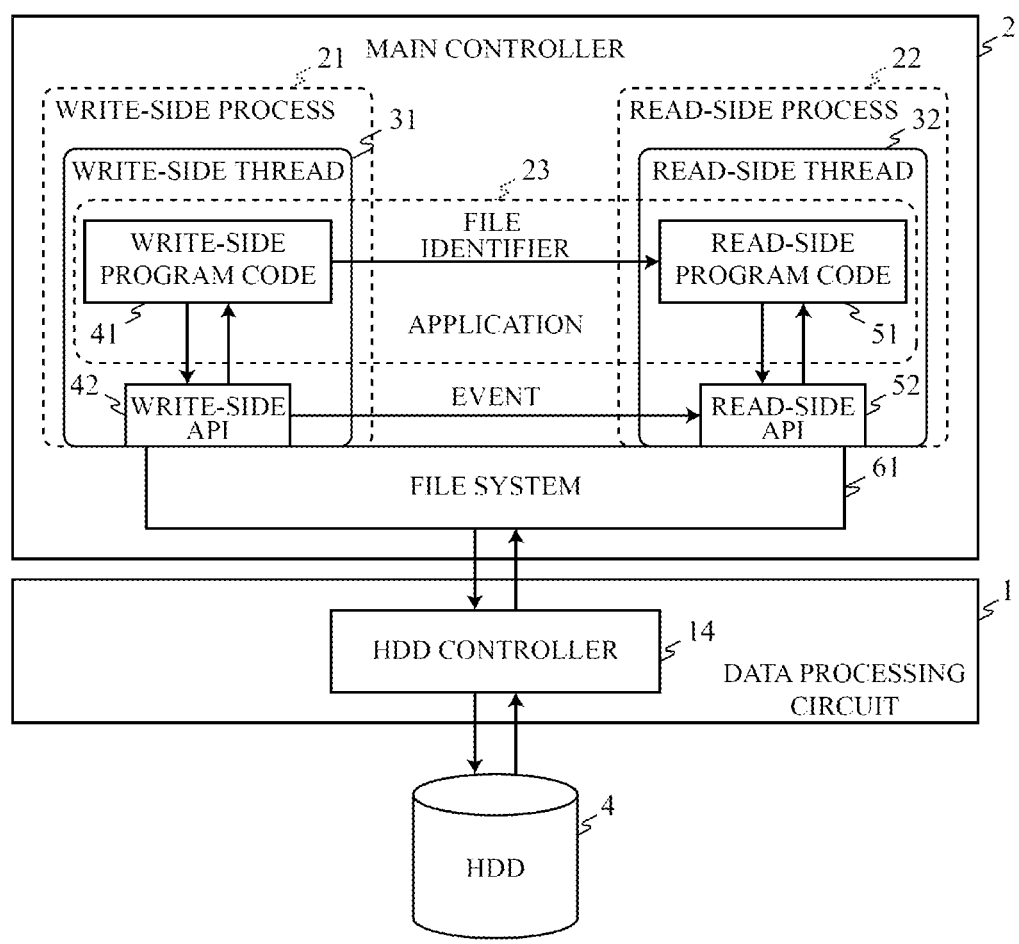
FIG. 4 shows a block diagram for describing a main controller according to a first embodiment.

FIG. 4 shows a block diagram for describing the main controller 2 according to the first embodiment.

In main controller 2, an operating system corresponding to a multi-process and a multi-thread is running. Main controller 2 executes data processing program code and generates write-side process 21 and read-side process 22. Main controller 2 executes application 23 for buffering data via HDD 4 using write-side process 21 and read-side process 22. Write-side program code 41 of application 23 is executed in write-side thread 31 in write-side process 21. Main controller 2 executes write-side program code 41 to enable HDD controller 14 of data processing circuit 1 to write the band data to HDD 4. Specifically, main controller 2 carries out the write operation in write-side thread 31 under write-side program code 41. Main controller 2 calls a shared library of file system 61 using write-side API 42 to open/close a file for the write operation.

On the other hand, read-side program code 51 of application 23 is executed in a read-side thread 32 in read-side process 22. Main controller 2 executes read-side program code 51 to enable HDD controller 14 to read out the band data from HDD 4. Specifically, main controller 2 carries out the read operation in read-side thread 32 under read-side program code 51. Main controller 2 calls a shared library of file system 61 using read-side API 52 to open/close a file for the read operation.

Figure 5A:
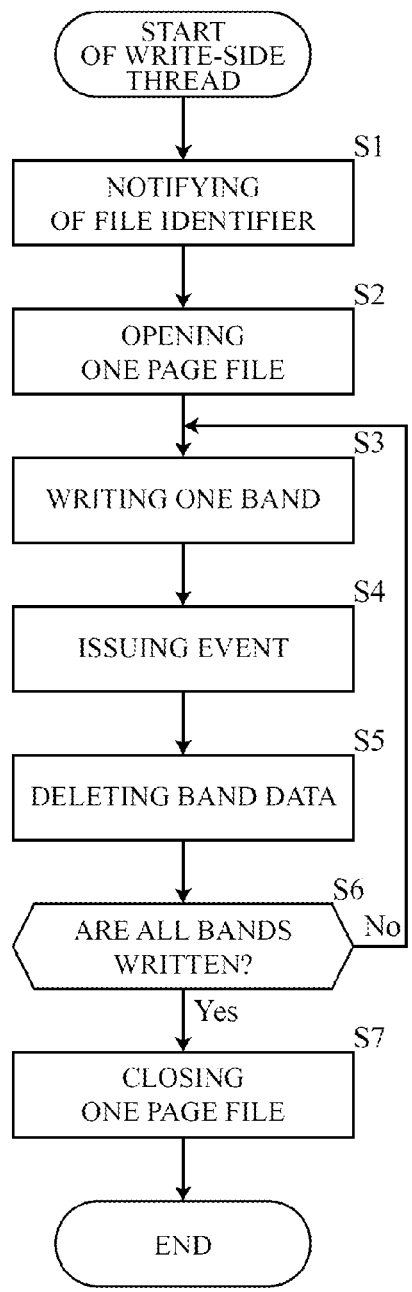
FIG. 5A shows a flow chart for describing a write operation in a write-side thread according to the first embodiment.

FIG. 5A shows a flow chart for describing the write operation in the write-side thread according to the first embodiment. The main controller carries out the write operation in the write-side thread under the write-side program code.

First of all, the main controller executes the write-side program code in the write-side thread. The main controller notifies the read-side process of a file identifier of the file for one page serving as the write destination of the band data (step S1). The file identifier is set, for example, as a file name. The main controller calls the shared library of the file system using the write-side API. Furthermore, the main controller opens the file corresponding to the file identifier to generate a file handle (step S2).

The main controller calls the write-side API of the file system after the file open and controls the HDD controller to write the band data to the file in the HDD (step S3). At this time, the main controller reads out the band data through DMA transfer from the RAM. The HDD controller writes the band data read out from the RAM to the HDD. When the write operation of one piece of band data to the HDD is completed, the main controller issues an event using the write-side API (step S4). The main controller deletes the band data whose write operation is completed from the RAM (step S5).

In this manner, the plural pieces of the band data for the one page are written to the HDD in order. When the write operation of all the pieces of the band data for the one page is completed (step S6), the main controller calls the shared library of the file system to close the file corresponding to the file identifier using the write-side API (step S7).

On the other hand, the main controller carries out the read operation in the read-side thread under the read-side program code.

Figure 5B:
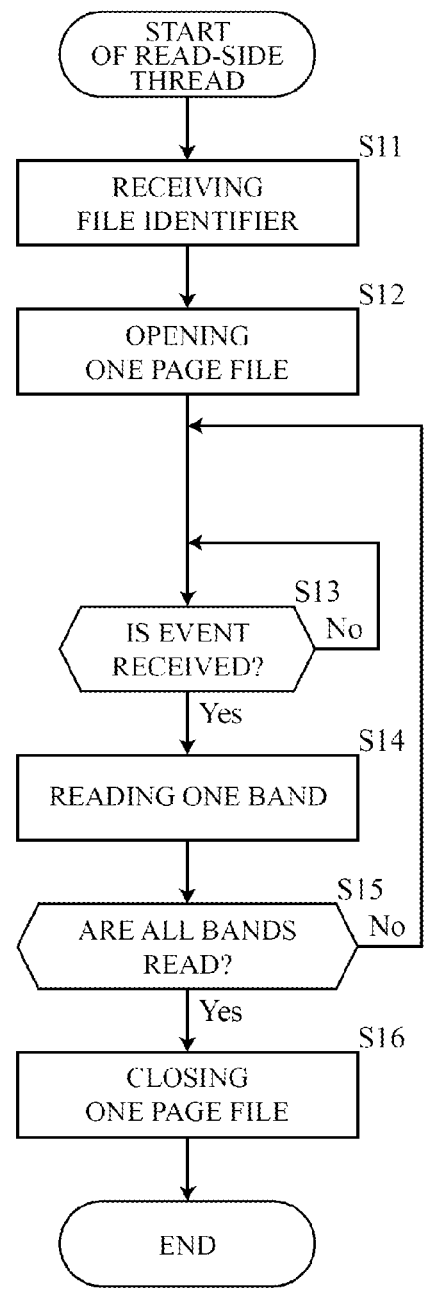
FIG. 5B shows a flow chart for describing a read operation in a read-side thread according to the first embodiment.

FIG. 5B shows a flow chart for describing the read operation in the read-side thread according to the first embodiment.

First of all, the main controller executes the read-side program code in the read-side thread. At this time, the read-side program code operates asynchronously with respect to the write operation. The main controller receives the file identifier from the write-side thread (step S11). The main controller opens the file for the one page corresponding to the received file identifier to generate a file handle (step S12).

After the file is opened, the main controller stands by until the event is received (step S13). When the main controller 2 receives the event from the write-side, the main controller calls the read-side API of the file system to control the HDD controller to read out one piece of the band data from the file in the HDD (step S14). At this time, the HDD controller reads out the band data from the HDD. The main controller writes the band data read out from the HDD to the RAM through the DMA transfer.

In this manner, for every event from the write-side, the band data is read sequentially one by one. When the read operation of all the pieces of the band data for the one page is completed (step S15), the main controller calls the shared library of the file system to close the file corresponding to the file identifier using the read-side API (step S16). At this time, the HDD controller deletes the closed file from the HDD.

As described above, according to the first embodiment, the main controller 2 (i) generates the write-side process and the read-side process, (ii) notifies the read-side process from the write-side process of the file identifier of the file stored in the HDD 4, (iii) after that, causes the HDD controller 14 to sequentially write the series of band data to the HDD 4 using the write-side process, and (iv) causes the HDD controller 14 to read out the series of band data from the file corresponding to the file identifier using the read-side process when the file identifier is received in the read-side process.

With this configuration, before the band data is completely written to the HDD 4, the identifier (that is, the file identifier) of a storage area (that is, the file) for the buffer is provided to the read-side process, and the read operation can be started in the read-side process independently of the write-side process. For this reason, the data processing apparatus can read out the band data during the write operation of the data. Therefore, the delay in the processing after the data buffering to the HDD 4 as the storage can be reduced.

2. Second Embodiment

According to a second embodiment of the present disclosure, the main controller 2 generates a file write thread where a program code of the shared library is executed for writing the band data to the file and a file read thread where a program code of the shared library is executed for reading out the band data from the file. The file write thread and the file read thread are generated in addition to the write-side thread and the read-side thread where the application is executed. With this configuration, the data processing apparatus carries out the write/read operation of the band data asynchronously with respect to the processing of the application.

An operation of the main controller 2 according to the second embodiment will be described below.

Figure 6:
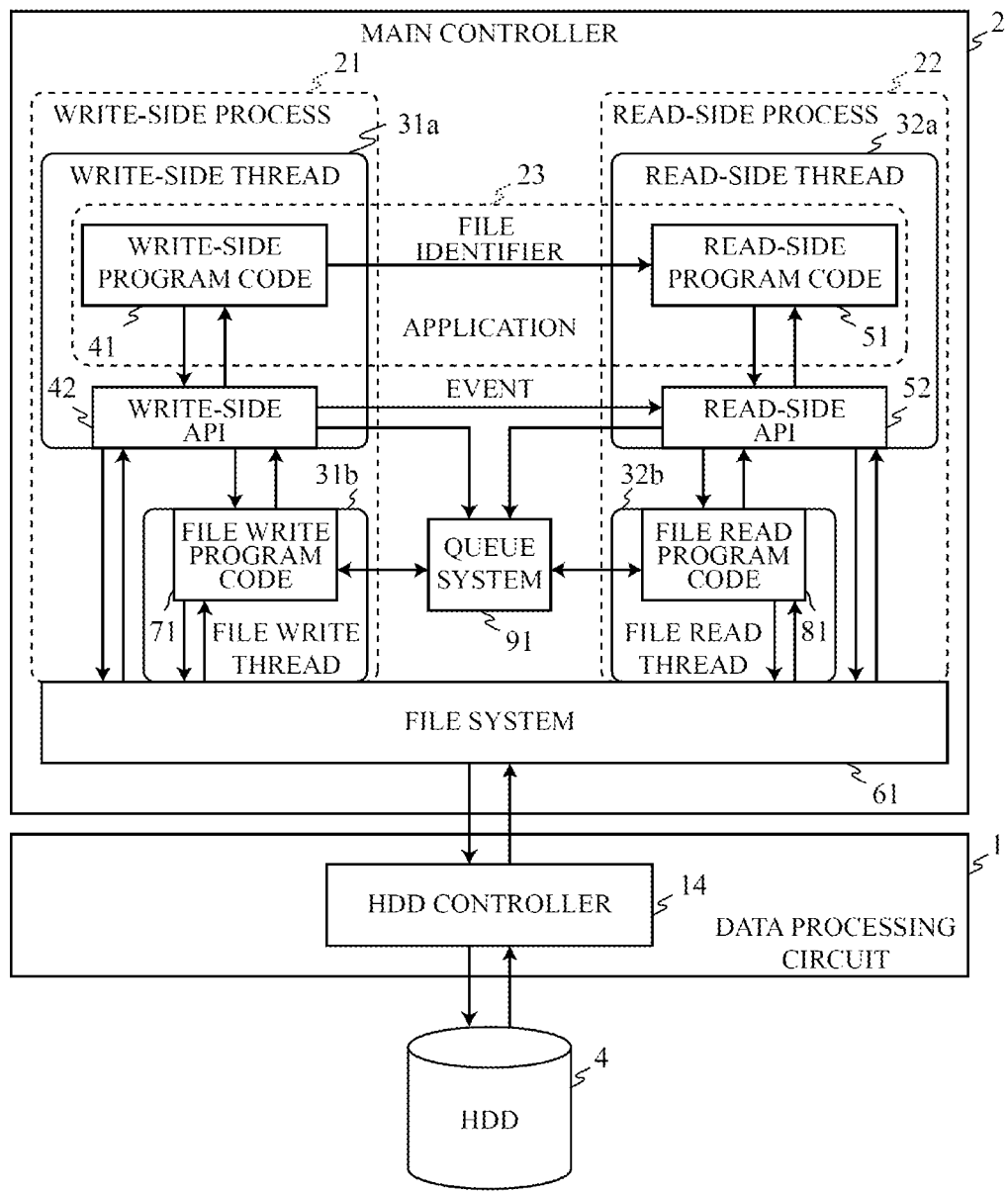
FIG. 6 shows a block diagram for describing the main controller according to a second embodiment.

FIG. 6 shows a block diagram for describing the main controller 2 according to the second embodiment.

In main controller 2, the operation system corresponding to the multi-process and the multi-thread is running. Main controller 2 executes data processing program code 8 and generates write-side process 21 and read-side process 22 first. Main controller 2 executes application 23 for buffering the data via HDD 4 using write-side process 21 and read-side process 22. Write-side program code 41 of application 23 is executed in write-side thread 31a in write-side process 21. Main controller 2 executes write-side program code 41 to enable HDD controller 14 of data processing circuit 1 to write the band data to HDD 4. Specifically, main controller 2 carries out the write operation in write-side thread 31a under write-side program code 41. Main controller 2 calls a shared library of file system 61 using write-side API 42 to open/close a file for the write operation.

On the other hand, read-side program code 51 of application 23 is executed in read-side thread 32a in read-side process 22. Main controller 2 executes read-side program code 51 to enable HDD controller 14 to read out the band data from HDD 4. Specifically, main controller 2 carries out the read operation in read-side thread 32a under write-side program code 51. Main controller 2 calls a shared library of file system 61 using read-side API 52 to open/close a file for the read operation.

Main controller 2 generates file write thread 31b in write-side process 21. Main controller 2 executes file write program code 71 of the shared library for writing the band data to the file in file write thread 31b. Main controller 2 generates file read thread 32b in read-side process 22. Main controller 2 executes file read program code 81 of the shared library for reading out the band data from the file in file read thread 32b. Furthermore, main controller 2 generates a data read request and a data write request in application 23. Main controller 2 queues a data write request and a data read request as access requests in queue system 91. Main controller 2 executes file write program code 71 and file read program code 81 on the basis of the access request queued in queue system 91 to carry out the write/read operation of the band data. With this configuration, the data processing apparatus carries out the write/read operation of the band data asynchronously with respect to the processing of application 23.

If main controller 2 receives the data on the document, main controller 2 stores the data in RAM 3 in the three-layer structure shown in FIG. 3 in write-side thread 31a. At this time, one piece of document node data is added to the document link list with regard to one document, and the same number of pieces of page node data as the number of pages included in the document is added to the page link list. Furthermore, a storage area for the band link list is newly secured with regard to the respective pages, and the band link list is stored in the storage area. When main controller 2 stores the plural pieces of the band data for the one page in RAM 3, main controller 2 adds the page node data on the page to the page link list and also secures storage areas for the pieces of band data. When the write operation for the page is completed, main controller 2 releases the storage area, and deletes the page node data from the page link list. If a free space of RAM 3 is short when the storage area for the band data is secured, main controller 2 may stand by until storage area for band data for another page is released. When the storage area is released, main controller 2 secures the storage area for the band data for the new page.

Figure 7:
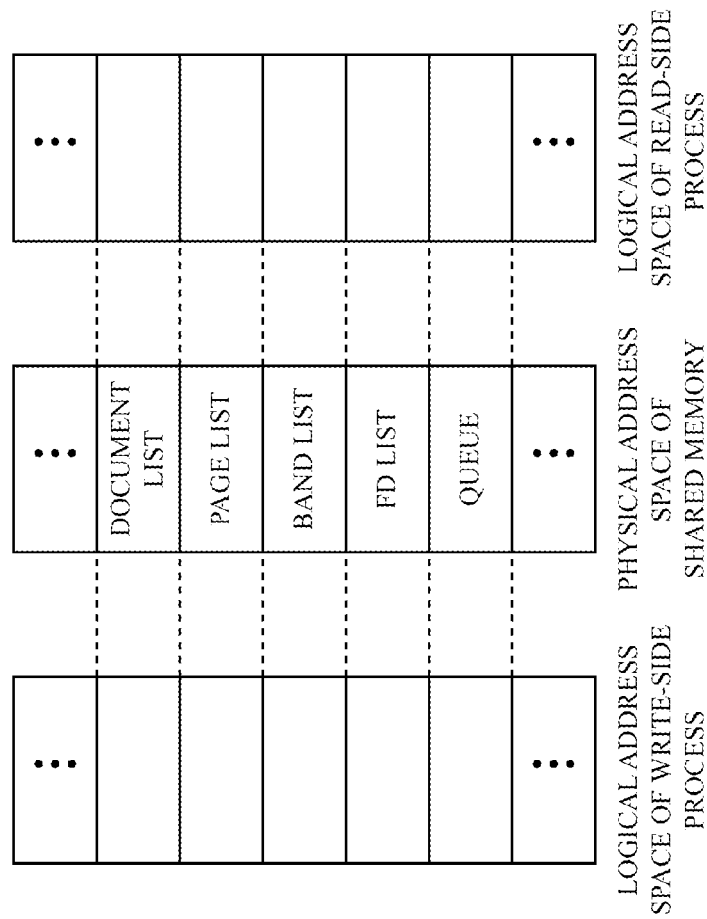
FIG. 7 shows a shared memory area in a queue system in FIG. 6.

FIG. 7 shows a shared memory area in the queue system in FIG. 6. This shared memory area may be allocated in the RAM 3. A physical address thereof is subjected to mapping to logical addresses of the write-side process and the read-side process. With this configuration, the shared memory area can be accessed from the respective processes. In the queue system, this shared memory area has a document list area, a page list area, an file descriptor (FD) list area, and a queue area.

In the document list area, the document node data in regard to the band data of the write target or the read target is stored by the write-side API or the read-side API. The document node data has the link information to the page node data constituting this document.

In the page list area, the page node data in regard to the band data that is the write target or the read target is stored by the write-side API or the read-side API. The page node data has the link information to the band data constituting this page and the link information to a file descriptor.

In the band list area, the node data of the band that is the write target or the read target is stored by the write-side API or the read-side API. The node data of the band has the identification information on the document and the page corresponding to this band. Furthermore, the node data of the band has the identification information of the band data in the file.

In the FD list area, the file descriptor of the file corresponding to the page is written for each page by the write-side API or the read-side API.

In the queue area, the access request is written for each band data by the write-side API 42 or the read-side API 52. The access request includes an access type (write or read) and the identification information of the target band data. Therefore, the data write request and the data read request are mixed in one queue.

Access to the queue system may be exclusively controlled through semaphore. Therefore, the access cannot be carried out from two or more of the write-side thread, the file write thread, the read-side thread, and the file read thread in a time. That is, exclusive control is performed so that the one queue is accessed by only one process simultaneously. For this reason, a reduced amount of resources is used for the queuing.

Figure 8A:
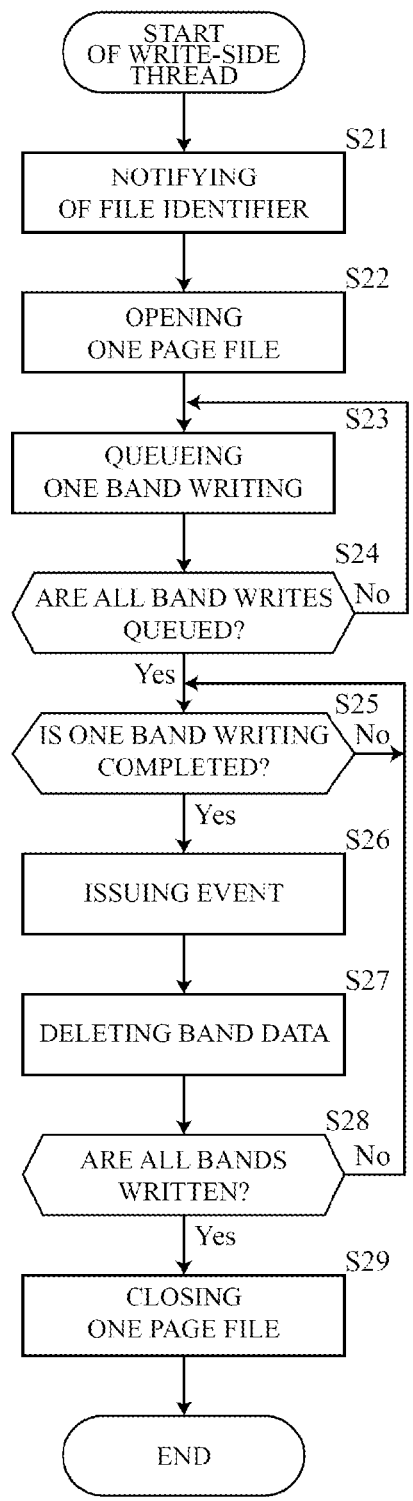
FIG. 8A shows a flow chart for describing a write operation in a write-side thread according to the second embodiment.

FIG. 8A shows a flow chart for describing the write operation in the write-side thread according to the second embodiment. The main controller carries out the write operation in the write-side thread under the write-side program code.

First, the main controller executes the write-side program code in the write-side thread. The main controller notifies the read-side process of the file identifier of the file for one page serving as the write destination of the band data (step S21). The file identifier is, for example, a file name. The main controller calls the shared library of the file system using the write-side API. Furthermore, the main controller opens the file corresponding to the file identifier to generate a file handle (step S22).

After the file is opened, the main controller calls the write-side API of the file system and queues data write requests of the band data to the file corresponding to the file identifier in order in the queue system. The main controller supplies write instructions of the respective pieces of the band data to the file write thread in response to the data write request (step S23). In the write instruction, pieces of identification information of the band data that become the write target, that is, the identification information on the document including the band data, the identification information on the page including the band data, and the identification information of the band data in the page, are specified. The main controller repeatedly performs processing in step S23 until the data write requests of all the band data are queued (step S24).

Figure 8B:
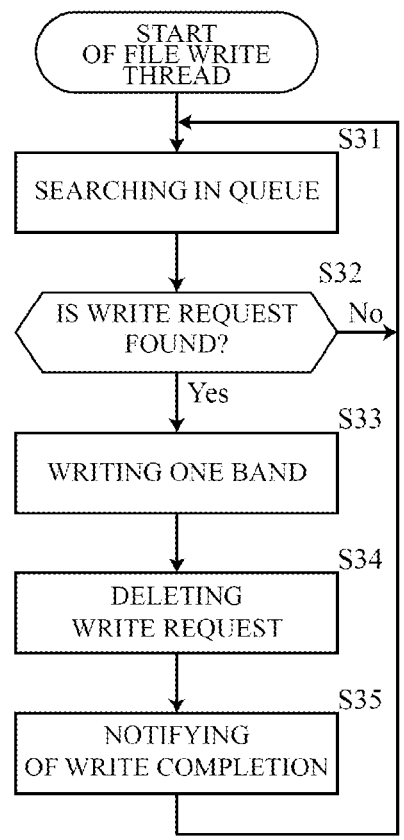
FIG. 8B shows a flow chart for describing a write operation in a file write-thread according to the second embodiment.

FIG. 8B shows a flow chart for describing a write operation in a file write-thread according to the second embodiment. The main controller carries out the write operation in the file write thread under the file write program code.

The main controller searches for the access request in the queue (step S31). If the main controller finds the data write request of the band data where the write instruction exists (step S32), the main controller identifies the band data and the write destination specified by the data write request from the structure data written in the queue system and the file descriptor. The main controller reads out the band data from the RAM through DMA transfer to the HDD controller.

At this time, the main controller identifies the document and the page corresponding to the band of the write target from the data write request. Subsequently, the main controller identifies the document node data of the identified document. The main controller identifies the page link list at the link destination on the basis of the link information on the identified document node data and identifies the page node data on the page identified from the data write request from this page link list. Then, the main controller identifies the band link list at the link destination on the basis of the link information on the identified page node data and identifies the band data that is the write target corresponding to the data write request from this band link list.

In this manner, the main controller can identify and read out the band data corresponding to the particular page in the document from the identification numbers of the document, the page, and the band, while tracing the above-mentioned link.

The HDD controller writes the read out band data to the identified write destination (step S33).

When the write operation of one piece of the band data is completed, the main controller deletes the data write request of the band data from the queue (step S34). Main controller supplies write-side API with a data write completion notification on the band data (step S35).

In this manner, the queued data write request is processed asynchronously by executing the file write program code of the file write thread separate from the application.

As shown in FIG. 8A, when the write-side API is supplied with the data write completion notification, the main controller issues an event using the write-side API (step S26). The main controller deletes the band data whose data writing is completed from the RAM (step S27).

Then, when the write operation of all the pieces of the band data for the one page is completed (step S28), the main controller calls the shared library of the file system using the write-side API and closes the file corresponding to the file identifier (step S29).

On the other hand, the main controller carries out the read operation in the read-side thread under the read-side program code.

Figure 9A:
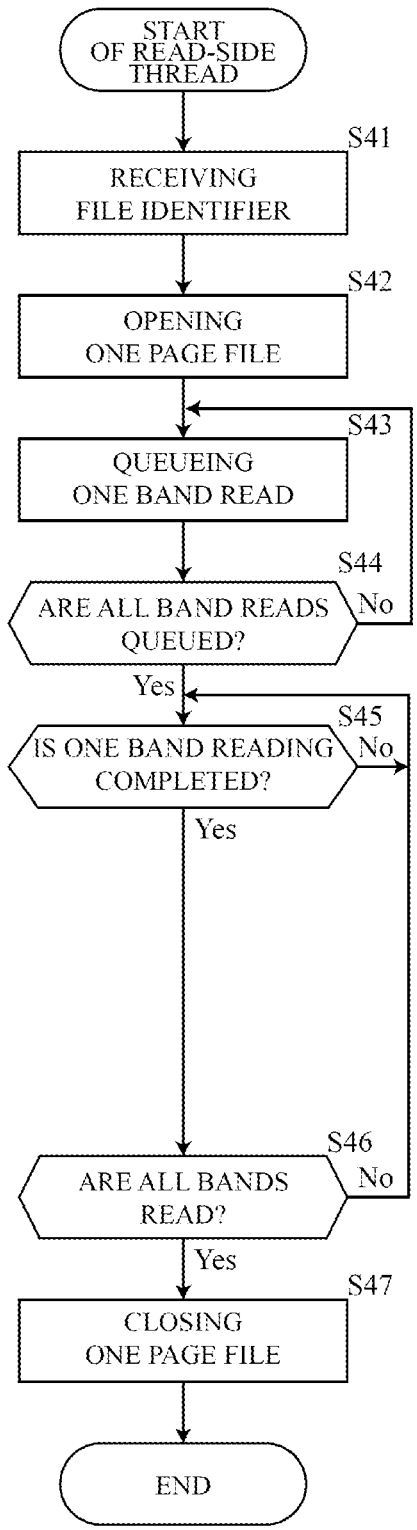
FIG. 9A shows a flow chart for describing a read operation in a read-side thread according to the second embodiment.

FIG. 9A shows a flow chart for describing the read operation in the read-side thread according to the second embodiment.

First of all, the main controller executes the read-side program code in the read-side thread. At this time, the read-side program code operates asynchronously with respect to the write operation. The main controller receives the file identifier from the write-side thread (step S41). The main controller opens the file corresponding to the file for the one page corresponding to the received file identifier to generate the file handle (step S42).

After the file is opened, the main controller calls the read-side API of the file system and queues the data read requests of the respective pieces of the band data from the file corresponding to the file identifier in order in the queue system. The main controller supplies read instructions of the respective pieces of the band data to the file read thread in response to the data read request (step S43). In the read instruction, pieces of the identification information of the band data that become the read target, that is, the identification information on the document including the band data, the identification information on the page including the band data, and the identification information of the band data in the page, are specified. The main controller repeatedly performs processing in step S43 until the data read requests for all the pieces of band data are queued (step S44).

Figure 9B:
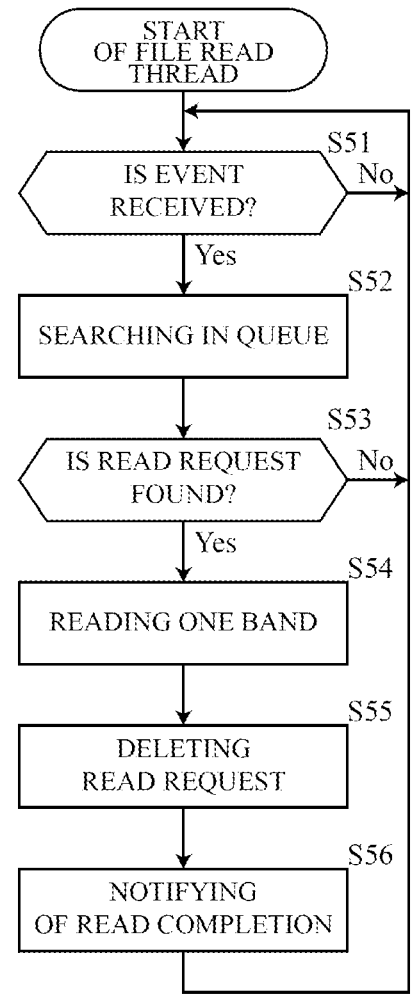
FIG. 9B shows a flow chart for describing a read operation in a file read thread according to the second embodiment.

FIG. 9B shows a flow chart for describing a read operation in a file read thread according to the second embodiment. The main controller carries out the read operation in the file read thread under the file read program code.

The main controller receives an event in file read thread when the write operation of the band data is completed (step S51). The main controller searches for the data read request in the queue (step S52). If the main controller finds the data read request of the band data where the read instruction exists (step S53), the main controller calls the read-side API of the file system and controls the HDD controller to read out the band data from the file in the HDD (step S54). At this time, the band data specified by the data read request and the read source are identified by the structure data written to the queue system and the file descriptor. The HDD controller reads out the band data from the identified read source. The main controller writes the read out band data through the DMA transfer to the RAM.

When the read operation of one piece of the band data is completed, the main controller deletes the data read request for the band data from the queue (step S55) and supplies the read-side API with the data read completion notification on the band data (step S56).

In this manner, the band data is read out in order for every event from the write-side. As shown in FIG. 9A, the main controller determines whether or not the read operation of all the pieces of the band data for the one page is completed for each data read completion notification (step S46). When the read operation of all the pieces of the band data for the one page is completed, the main controller calls the shared library of the file system using the read-side API and closes the file corresponding to the file identifier (step S47). At this time, the HDD controller deletes the closed file from the HDD.

As described above, according to the above-mentioned second embodiment, the main controller 2 (i) generates the write-side thread and the file write thread by the write-side process, (ii) generates the read-side thread and the file read thread by the read-side process, (iii) notifies the read-side thread from the write-side thread of the identifier of the file in the HDD 4 and thereafter sequentially queues the data write requests for each of the series of band data in the write-side thread, (iv) causes the HDD controller 14 to write the series of band data using the file write thread in the order of the queued data write requests, (v) sequentially queues the data read requests for each of the series of band data when the file identifier of the file is received by the read-side thread, and (vi) causes the HDD controller 14 to read out the series of band data in the order of the queued data read requests using the file read thread.

With this configuration, as the file write program code for writing the band data to the HDD 4 is executed in the file write thread, the asynchronous write operation is carried out, and it is possible for the write-side program code to execute another processing without waiting for the completion of the write operation. Also, as the file read program code for reading out the band data from the HDD 4 operates by the file read thread, the asynchronous read operation is carried out, and it is possible for read-side program code 51 to execute another processing without waiting for the completion of the read operation.

Also, according to the above-mentioned second embodiment, the band data for one page is set as the link list provided to each page in the document and stored in the RAM 3. Furthermore, the RAM 3 stores the page node data indicating the respective pages in the document. The page node data of a certain page has a link to the leading of the plural pieces of band data for the relevant page.

With this configuration, as the pieces of band data are set as a separate link list for each page, it is possible to find the band data of the processing target from the pieces of band data in a short period of time.

3. Third Embodiment

According to a third embodiment of the present disclosure, in the write thread, an event is issued at a time when the queuing of the data write requests for the band data is completed. In the file read thread, if the band data exists in the RAM 3, the band data is read out from the RAM 3, and if the band data does not exist in the RAM 3, the band data is read out from the file of the HDD 4.

A basic structure of a main controller 2 according to the third embodiment is similar to that of the second embodiment (FIG. 6), but the operations in the write thread and the file read thread are different from those of the second embodiment (FIG. 6).

FIG. 10A shows a flow chart for describing a write operation in a write-side thread according to the third embodiment. Steps S21 to S29 are as described in the second embodiment. As illustrated in FIG. 10A, according to the third embodiment, in the write thread, instead of the time when the write operation of the band data is completed, each time the queuing of the write request for the band data is ended (step S23), the main controller issues an event (step S61).

Figure 11A:
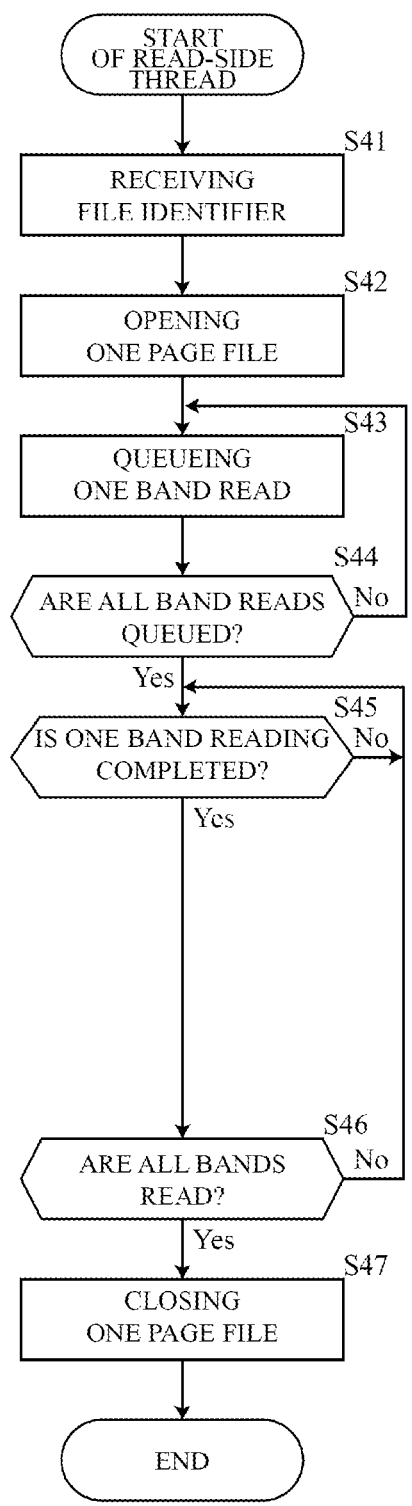
FIG. 11A shows a flow chart for describing a read operation in a read-side thread according to the third embodiment.

FIG. 10B shows a flow chart for describing a write operation in a file write-thread according to the third embodiment. FIG. 11A shows a flow chart for describing a read operation in a read-side thread according to the third embodiment. FIG. 10B and 11A are the same as respective FIGS. 8B and 9A of the second embodiment. Therefore, the file write thread and the read-side thread perform same as that of the second embodiment.

Figure 11B:
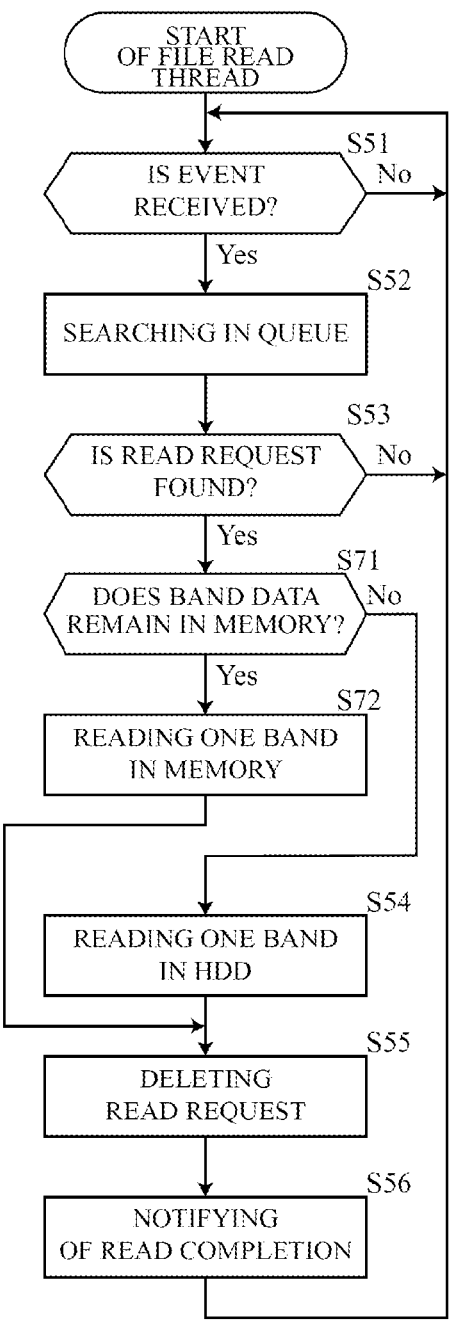
FIG. 11B shows a flow chart for describing a read operation in a file read-thread according to the third embodiment.

FIG. 11B shows a flow chart for describing a read operation in a file read-thread according to the third embodiment. Steps S51 to S56 are the same as those described in the second embodiment. As illustrated in FIG. 11B, in the file read thread, if the access request is found in the queue, the main controller checks whether or not the band data of the read target remains in the RAM (step S71). As a result, if the band data of the read target remains in the RAM, by the file read thread under the file read program code, the main controller reads out the band data from the RAM (step S72). If the band data of the read target does not remain in the RAM, the main controller controls the HDD controller to read out the band data from the file of the HDD. At this time, the HDD controller reads out the band data from the HDD (step S54).

In this manner, if the band data of the read target remains in the RAM, the band data is read out from the RAM instead of the HDD. For this reason, the writing of the band data to the HDD is not necessary on the basis of the data write request for the band data. However, the data write request remains in the queue system. If the job (document) having such an unnecessary data write request remains, even when the job is completed on the read-side (that is, the read operation of the document is completed), until the data write request is processed, the job is not completed on the write-side, and the subsequent processing is delayed. For this reason, in the read thread, at a specified timing, the main controller deletes the data write request for the band data already read out from the RAM from the queue. According to this embodiment, the timing for the deletion of the data write request is the time of the job completion on the read-side.

Figure 12:
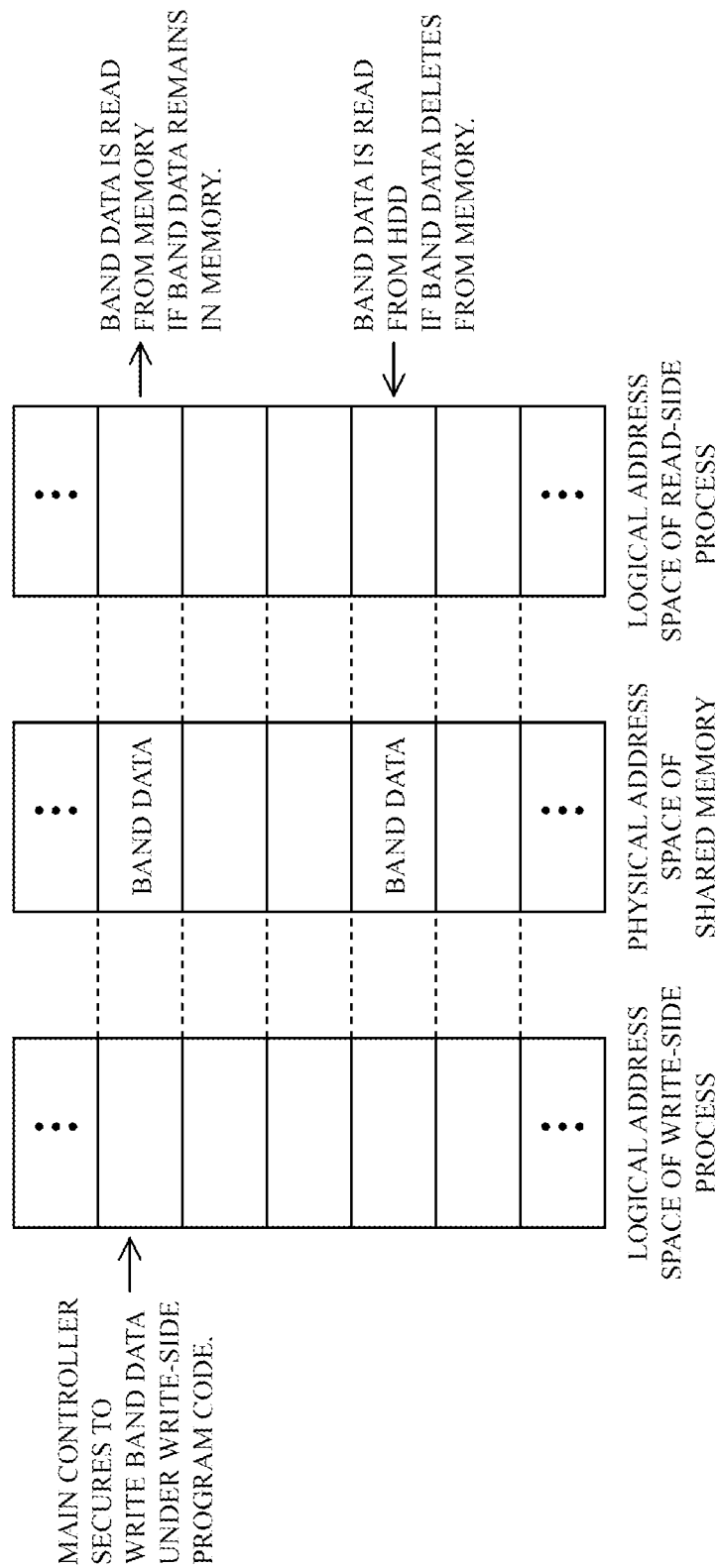
FIG. 12 schematically shows a read operation of the band data from a RAM according to the third embodiment.

FIG. 12 schematically shows the read operation of the band data from the RAM 3 according to the third embodiment. The band data is stored in a particular shared memory area in the RAM 3. The physical address of this shared memory area is subjected to mapping to logical addresses of the write-side process and the read-side process, and the access to the shared memory area can be made from the write thread, the file write thread, the read thread, and the file read thread of the write-side process and the read-side process.

As described above, according to the above-mentioned third embodiment, the main controller 2 (i) stores one piece of the band data in the RAM 3 in the write-side process, (ii) issues an event each time the data write request for one piece of the band data is queued by the write thread, (iv) deletes the band data from RAM 3 when the data writing of the band data to the HDD 4 is completed by the read thread, (v) when the queued data read requests are sequentially executed, if the band data of the read target exists in the RAM 3, by the file read thread 32b, reads out the band data from the RAM 3 without reading out the band data from the HDD 4, and (vi) if the band data does not exist in the RAM 3, causes the HDD controller 14 to read out the band data from the HDD 4.

With this configuration, if the band data remains in the RAM 3, it is possible to immediately use the band data in the RAM 3. For this reason, it is possible to read out the data in a short period of time compared to the read operation from the HDD 4, and it is possible to suppress the delay at the time of the read operation.

Also, according to the above-mentioned third embodiment, the main controller 2 deletes the data write request for the band data read out from the RAM 3 from the queue at the specified timing.

With this configuration, it is possible to avoid the processing delay caused by the data write request remaining in the queue although the band data has been read out from the RAM 3 without the intermediation of the HDD 4.

While the above embodiments are examples of the present disclosure, the present disclosure is not limited to the embodiments and various modifications and alterations may be made without departing from the spirit of the present disclosure.

For example, according to the above-mentioned third embodiment, while the band data is being read out from the RAM 3 by the read thread, if the write operation of the band data to the HDD 4 is completed on the write-side, the main controller 2 may delete the band data from the RAM 3 by the write-side thread after the read operation of the band data is completed by the read-side thread. For example, such a processing can be realized through exclusive control of access to the storage area for the band data.

Also, according to the above-mentioned respective embodiments, before the data is written to the HDD 4, the main controller 2 may compress the data, and after the data is read out the HDD 4, the main controller 2 may expand the data. As example the compression and/or expansion methods, a JPEG (Joint Photographic Experts Group) system, an RLR (Run Length Encoding) system, and the like can be used.

Also, according to the above-mentioned respective embodiments, for the file identifier notified from the write-side to the read-side, the file handle may be used.

Also, according to the above-mentioned respective embodiments, the main controller 2 performs the data read and write with respect to the HDD 4 using the file system, but the file system may not be provided. In that case, instead of the file identifier, other identification information (for example, an address, a size, and the like) on the storage area on the HDD 4 for storing the band data for one page is used.

Also, according to the above-mentioned respective embodiments, the application of the write-side process and the application of the read-side process may be separate independent program codes.

Also, according to the above-mentioned respective embodiments, the HDD 4 is used as the storage, but a storage using a semiconductor memory such as an SSD (Solid State Drive) may additionally or alternatively be used.

Also, according to the above-mentioned respective embodiments, the numbers of processes on the write-side and the read-side are respectively one, but a plurality of similar processes may be generated on either or both the write-side and the read-side. In that case too, one queue system according to the second and third embodiments suffices.

Also, according to the above-mentioned respective embodiments, the single memory controller processes both the processes on the write-side and the read-side, but a processor having a plurality of processing elements may process the processes on the write-side and the read-side separately.

Also, according to the above-mentioned respective embodiments, the image data divided into the band data is processed, but the present disclosure can be applied to an apparatus that divides data of another type into blocks having a particular size, and performs a process for each block.

The present disclosure can be applied, for example, to an image processing apparatus in an image forming apparatus such as a copier, a printer, or a multifunctional peripheral.

As described above, according to the embodiments of the present disclosure, before the write operation of the data to the storage, the identifier of the storage area for the buffer is supplied to the read-side process, and independently from the write-side process, the read operation can be started in the read-side process, so that the read operation can also be carried out in mid-course of the write operation. Therefore, it is possible to suppress delay in the subsequent-stage processing caused by the data buffering to the storage.

Also, each of the data blocks obtained by dividing the particular unit of data can be read out immediately after the completion of the write operation. For this reason, it is possible to suppress the delay in the processing caused by the data buffering to the storage.

Also, the storage area for the buffer can be managed by the file system, and the access to the data in the storage can easily be carried out from the respective processes.

Also, the data related to the image processing can easily be accessed in the image forming apparatuses such as the printer and the copying multifunctional peripheral.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A data processing apparatus comprising:
   a storage controller configured to write a series of data blocks constituting a particular unit of data to a storage and to read out the series of data blocks from the storage; and
   a processor configured to:
   generate a write-side process and a read-side process;
   notify the read-side process from the write-side process of an identifier of a storage area in the storage;
   cause the storage controller to sequentially write the series of data blocks to the storage area using the write-side process;
   cause the storage controller to read out the series of data blocks from the storage area corresponding to the identifier using the read-side process after the identifier is received in the read-side process;
   issue an event in the write-side process each time one data block is written to the storage area;
   cause the storage controller to read out one data block from the storage area using the read-side process after the event is received in the read-side process;
   generate a first thread and a third thread in the write-side process;
   generate a second thread and a fourth thread in the read-side process;
   notify the second thread from the first thread of an identifier of the storage area in the storage;
   queue a data write request for each of the series of data blocks in order in the first thread;
   cause the storage controller to write the series of data blocks in the order of the queued data write requests to the storage area using the third thread;
   queue a data read request for each of the series of data blocks in order after the identifier is received in the second thread; and
   cause the storage controller to read out the series of data blocks in the order of the queued data read requests from the storage area using the fourth thread.

2. The data processing apparatus according to claim 1, wherein the processor is further configured to:
   put the storage controller in a standby state for reading out the series of data blocks from the storage area corresponding to the identifier using the read-side process for a period of time before the event is received in the read-side process.

3. The data processing apparatus according to claim 1, wherein the processor is further configured to:

issue an event in the first thread each time one data block is written to the storage area, and cause the storage controller to read out one data block from the storage area using the fourth thread after the event is received in the fourth thread.

4. The data processing apparatus according to claim 1, wherein the processor is further configured to:

store the data blocks in a memory in the third thread, issue an event each time the data write request for the data block is queued in the first thread, delete the data block from the memory in the third thread when the storage controller completes a write operation of the data blocks to the storage area, and when the queued data read requests are sequentially executed in a read operation, read out the data blocks from the memory in the fourth thread if the data blocks exist in the memory and cause the storage controller to read out the data blocks from the storage area using the fourth thread if the data blocks do not exist in the memory.

5. The data processing apparatus according to claim 4, wherein:

the memory is a shared memory of the write-side process and the read-side process;

the data write request generated in the write-side process and the data read request generated in the read-side process are registered in a same queue; and the queue is exclusively controlled in a manner that an access is allowed from only one process at any one time.

6. The data processing apparatus according to claim 1, further comprising a memory configured to store the series of data blocks, wherein:

the series of data blocks are plural pieces of band data constituting image data for one or more pages of a document;

the memory stores page nodes representing respective pages in the document;

the plural pieces of band data are link lists provided for each respective page node; and the page node for each respective page in the document has a link to a leading of the plural pieces of band data representative of the page.

7. The data processing apparatus according to claim 6, wherein the processor is configured to identify a leading position of the plural pieces of band data with the page node using the third thread and cause the storage controller to write the plural pieces of band data while tracing the link list.

8. The data processing apparatus according to claim 6, wherein the processor is further configured to:

secure a storage area for the plural pieces of band data when the plural pieces of band data for one page are stored in the memory, release the storage area when the write operation for the page is completed, and secure the storage area for the plural pieces of band data when a storage area for the plural pieces of band data for another page is released, if a free space of the memory is short.

9. The data processing apparatus according to claim 1, wherein the processor is further configured to:

store the data blocks in a memory in the third thread, issue an event in the first thread each time a data write request for the data blocks is queued, delete the data blocks from the memory in the third thread when the write operation of the data blocks to the storage area is completed, when the queued data read requests are executed in order, read out the data block from the memory in the fourth thread if the data block exists in the memory and cause the storage controller to read out the data block from the storage area using the fourth thread if the data block does not exist in the memory, and delete the data write request on the data block read out from the memory from the queue at a specified timing.

10. The data processing apparatus according to claim 9, wherein the processor is further configured to delete the data write request with regard to the data block read out from the memory at the time of job completion from the queue.

11. The data processing apparatus according to claim 1, wherein:

the series of data blocks are written to a file in the storage; and the identifier of the storage area is an identifier of the file.

12. The data processing apparatus according to claim 1, wherein:

the series of data blocks are plural pieces of band data constituting image data for one page; and the storage is a buffer that temporarily stores the image data before or after an image processing is performed on the image data.

13. A non-transitory computer-readable recording medium that stores a data processing program code to be executed by a processor of a data processing apparatus, the data processing program code comprising:

a first sub-program code for causing the processor to generate a write-side process and a read-side process and for causing the processor to generate a first thread and a third thread in the write-side process and generate a second thread and a fourth thread in the read-side process;

a second sub-program code for causing the processor to notify the read-side process from the write-side process of an identifier of a storage area in the storage and for causing the processor to notify the second thread from the first thread of an identifier of the storage area in the storage;

a third sub-program code for causing the processor to control a storage controller to sequentially write a series of data blocks constituting a particular unit of data to the storage area using the write-side process and for causing the processor to queue a data write request for each of the series of data blocks in order in the first thread and cause the storage controller to write the series of data blocks in the order of the queued data write requests to the storage area using the third thread;

a fourth sub-program code for causing the processor to control the storage controller to read out the series of data blocks from the storage area corresponding to the identifier using the read-side process after the identifier is received in the read-side process and causing the processor to queue a data read request for each of the series of data blocks in order after the identifier is received in the second thread and cause the storage controller to read out the series of data blocks in the order of the queued data read requests from the storage area using the fourth thread.

14. The non-transitory computer-readable recording medium of claim 13, the data processing program code further comprising:

a seventh sub-program code for causing the processor to put the storage controller in a standby state for reading out the series of data blocks from the storage area corresponding to the identifier using the read-side process for a period of time before the event is received in the read-side process, and a eighth sub-program code for causing the processor to cause the storage controller to read out one data block from the storage area using the read-side process after the event is received in the read-side process.

15. The non-transitory computer-readable recording medium of claim 13, wherein:

the series of data blocks are written to a file in the storage; and the identifier of the storage area is an identifier of the file.

16. A data processing method comprising:

writing, via a storage controller, a series of data blocks constituting a particular unit of data to a storage, reading, via the storage controller, the series of data blocks from the storage;

generating, via a processor, a write-side process and a read-side process;

notifying, via the processor, the read-side process from the write-side process of an identifier of a storage area in the storage;

causing, via the processor, the storage controller to sequentially write the series of data blocks to the storage area using the write-side process;

causing, via the processor, the storage controller to read the series of data blocks from the storage area corresponding to the identifier using the read-side process after the identifier is received in the read-side process;

issuing, via the processor, an event in the write-side process each time one data block is written to the storage area;

causing, via the processor, the storage controller to read out one data block from the storage area using the read-side process after the event is received in the read-side process;

generating, via the processor, a first thread and a third thread in the write-side process;

generating, via the processor, a second thread and a fourth thread in the read-side process;

notifying, via the processor, the second thread from the first thread of an identifier of the storage area in the storage;

queuing, via the processor, a data write request for each of the series of data blocks in order in the first thread;

causing, via the processor, the storage controller to write the series of data blocks in the order of the queued data write requests to the storage area using the third thread;

queuing, via the processor, a data read request for each of the series of data blocks in order after the identifier is received in the second thread; and causing, via the processor, the storage controller to read out the series of data blocks in the order of the queued data read requests from the storage area using the fourth thread.

17. The method of claim 16, further comprising:

putting, via the processor, the storage controller in a standby state for reading out the series of data blocks from the storage area corresponding to the identifier using the read-side process for a period of time before the event is received in the read-side process.

18. The method of claim 16, wherein:

the series of data blocks are written to a file in the storage; and the identifier of the storage area is an identifier of the file.

* * * * *